May 7, 1968     J. W. WILSON     3,381,981
END FITTINGS FOR FLEXIBLE CONDUITS

Filed Jan. 4, 1966     2 Sheets-Sheet 1

INVENTOR
John William Wilson
BY Arthur B. Colvin
ATTORNEY

May 7, 1968     J. W. WILSON     3,381,981
END FITTINGS FOR FLEXIBLE CONDUITS
Filed Jan. 4, 1966     2 Sheets-Sheet 2

INVENTOR
John William Wilson
BY
Arthur B. Colvin
ATTORNEY

7 May, 1968

United States Patent Office 3,381,981
Patented May 7, 1968

3,381,981
END FITTINGS FOR FLEXIBLE CONDUITS
John William Wilson, Slough, England, assignor to Superflexit Limited, Slough, England, a British company
Filed Jan. 4, 1966, Ser. No. 518,709
Claims priority, application Great Britain, Jan. 6, 1965, 599/65
3 Claims. (Cl. 285—149)

ABSTRACT OF THE DISCLOSURE

The invention relates to an end fitting which includes an externally threaded nipple adapted to screw into the end of a condit having a tubular outer screen or sheath, a tubular collar surrounding the nipple and a ferrule enclosing that part of the conduit surrounding the nipple and fitting an enlarged diameter part of the collar, the end of the screen or sheath being gripped by the ferrule and the collar.

---

More particularly the invention relates to end fittings for flexible conduits whcih are formed internally and externally with helical convolutions and are formed from plastics material such as polyvinyl-chloride or from one of the fluorocarbon products such as polytetrafluoroethylene, a polyamide or from synthetic or natural rubber.

Such flexible conduits are used for containing bunched electric conducting wires which are soldered or otherwise connected to electrical pins or sockets carried by multi-pin or multi-socket heads associated with the end fittings, such conduits and their associated end fittings being extensively used in electrical harnesses and layouts for aircraft, rockets, guided missiles and the like.

The end fitting in accordance wtih the present invention is suitable for use in connection with an externally and internally helically convoluted conduit without external and internal reinforcement other than a braided or other tubular outer screen or sheath or one which includes a helical wire reinforcement and an outer helically wound nylon or other cord wound onto the conduit between the external convolutions.

The chief object of the invention is to evolve an improved end fitting which will both securely grip the end of the conduit and also the surrounding metal tubular screen or sheath.

An end fitting in accordance with the present invention includes an externally threaded nipple adapted to screw into the end of the conduit, a tubular collar surrounding the nipple and fitting that part of the nipple not enclosed by the conduit and a ferrule enclosing that part of the conduit surrounding the nipple and fitting an enlarged diameter part of the collar, the end of the screen or sheath being gripped between the ferrule and collar.

According to a further feature of the invention one or both of the interengaging faces of the nipple, collar and ferrule is or are formed with a straight knurl or knurls which under an axially applied force, applied by means of a suitable tool ensure the parts being held firmly together.

That part of the conduit which surrounds the nipple and its enclosing screen or sheath will be sandwiched between the nipple and ferrule and due to this fact and also due to the fact that the end of the screen or sheath is gripped between the ferrule and collar, the conduit and screen will firmly resist an axially applied pull which might otherwise cause the conduit and/or screen to become detached from the end fitting.

Figure 1:
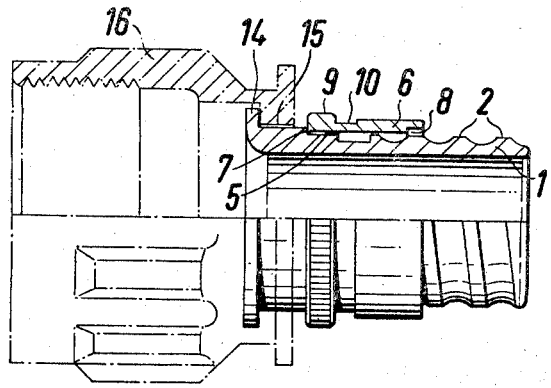
Figure 2:
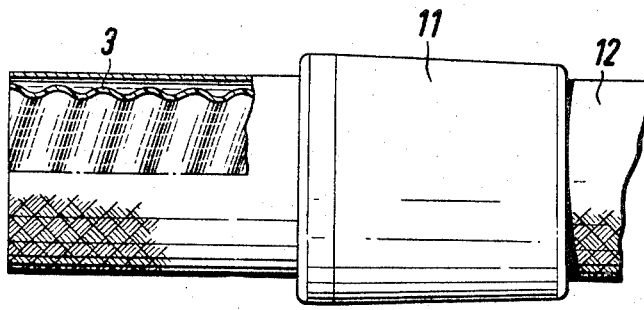
Figure 3:
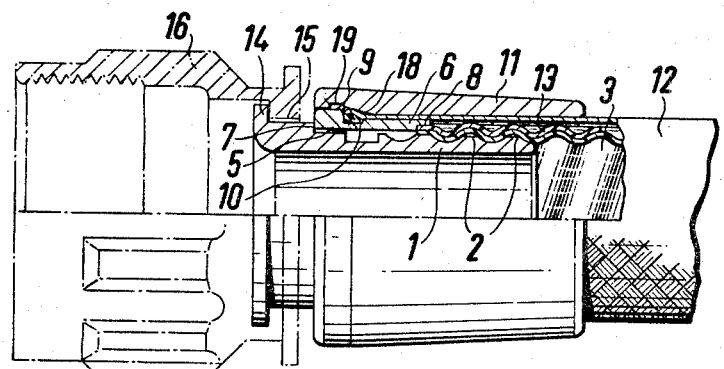
Figure 4:
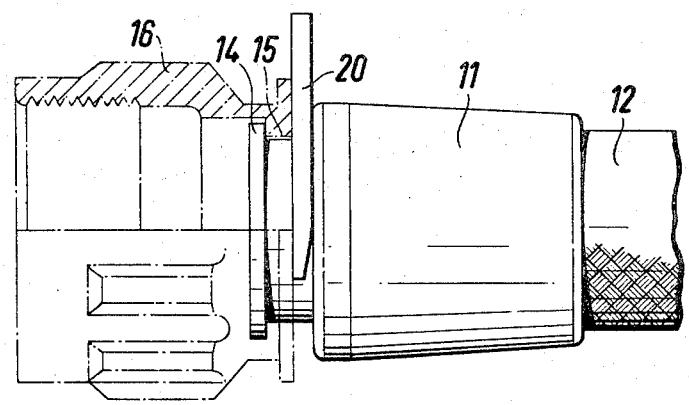

Referring to the accompanying drawings:
FIGURES 1 and 2 are part sectional, part elevational views of the end fitting parts and conduit ready for assembly;
FIGURE 3 is a part section, part elevation, showing the end fitting and conduit assembled;
FIGURE 4 is an elevation showing the use of a distance piece or its equivalent during assembly; and
FIGURE 5 is a part section, part elevational view showing the end fitting applied to an alternative type of conduit.

Figure 5:
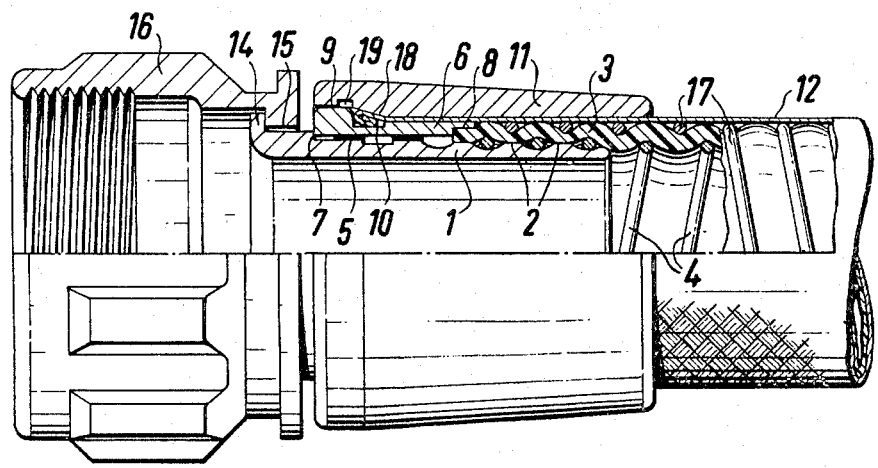

The end fitting comprises a tubular nipple 1 which is externally threaded at 2 throughout a part of its length to screw into the convoluted end of the conduit 3 or in the case of FIGURE 5 its helical internal reinforcement 4. The nipple is formed wth an annular face 5 for the reception of a tubular collar 6, the annular face and/or the engaging surface of the collar being formed with straight knurls which faces frictionally interengage when the collar is driven into position on the nipple, the collar when in position abutting against a shoulder 7 on the nipple. The collar is recessed at its extremity at 8 to receive the extremity of the conduit.

The collar at the end opposite to that which is recessed, is formed with an annular enlargement or flange 9 and an adjacent groove 10. The enlargement is formed with a straight knurl on its periphery to engage a corresponding knurl on the inner surface of a ferrule 11 which is finally forced into frictional gripping engagement with the enlargement. Alternatively only one of the engaging surfaces may be knurled i.e. either the ferrule or the enlargement 9.

The ferrule is internally so dimensioned that the end of the screen 12 is gripped between the ferrule and collar whilst that part of the conduit enclosing the nipple is gripped between the ferrule and nipple, through the screen.

To increase the effective diameter of the conduit, if the latter is not provided with internal and external reinforcement as in FIGURES 1 to 4, a short length 13 of conduit may be cut from a length of conduit and screwed onto the end of the conduit which will lie between the nipple and ferrule. In this way both conduit and screen will be more effectively gripped between the nipple and ferrule.

The extremity of the screen is intended to enter the annular groove 10 in the collar as shown in FIGURES 3 and 5.

The end of the nipple remote from the end which receives the conduit is preferably formed with an annular flange 14 for engagement by an internal flange 15 on a sleeve nut 16 by which the assembly is secured to an adjacent part, the nut being assembled on the nipple prior to the fitting of the collar.

The conduit shown in FIGURE 5 in addition to being reinforced internally by the wire helix 4 has a surrounding nylon or other suitable cord 17, the cord lying directly above the peaks of the threads on the nipple so that it will be effectively gripped between the ferrule and nipple The end fittings shown in FIGURES 1 to 4 and 5 are virtually identical and in both constructions the ferrule is formed with an internal conical face 18 and with an annular groove 19. The conical face in conjunction with the groove 10 in the collar 6 provide a substantial space for the entry of the extremity of the screen 12, the act of forcing the ferrule into position tending to turn over or bunch the edge of the screen to fill the space and thus assist in holding the screen firmly.

To assemble the end fitting, the nut 16 is placed in position upon the nipple 1 and the collar 6 advanced up the nipple and finally forced into frictional gripping engagement with the annular face 5 on the nipple.

The end of the conduit and reinforcement is then cut back so that the outer screen or sheath projects beyond the end of the conduit.

The nipple is then screwed into the end of the conduit until its extremity enters the recess in the collar and the extremity of the screen or sheath lies directly over the annular recess in the collar. The extremity of the screen or sheath may then be forced inwardly into the annular groove.

The ferrule which has previously been placed around the conduit is then advanced and finally forced over the annular enlargement 9 on the collar preferably by means of a special tool, a U-shaped distance piece 20 or wire spacing member being inserted if required temporarily between the end of the ferrule and the nut, as shown in FIGURE 4, the distance piece 20 being finally removed.

Although all the interengaging surfaces of the nipple, collar and ferrule may be knurled it will normally only be necessary to knurl one of the two interengaging faces, the second face being left plain.

I claim:

1. An end fitting for a convoluted conduit of the type having an encompassing metal sheath, said fitting comprising a nipple having an externally threaded portion adapted to screw into the end of the conduit, said nipple having an annular gripping surface longitudinally spaced from the threaded portion, a tubular collar adapted to surround the nipple and having one end adapted frictionally to engage said annular gripping surface, said collar having an annular outwardly extending flange and having a peripheral annular groove adjacent the annular flange thereof for the reception of the extremity of the tubular metal sheath, and a ferrule adapted to surround that part of the conduit surrounding the nipple and frictionally engage said flange, said ferrule having a portion radially spaced from the threaded portion of the nipple to provide an annular space for the entry of the convoluted end of the conduit and its surrounding tubular metal sheath, a part of the ferrule being adapted to surround said annular groove to provide an annular space for the entry of the metal tubular sheath to grip the latter against endwise movement, said two annular spaces each having a width such that the tubular metal sheath and the convoluted end of the conduit will be gripped radially and held firmly in position against endwise movement in relation to the end fitting, at least one of the interengaging surfaces of the nipple and collar and the collar and ferrule each being formed with a straight knurl to insure a better frictional inteengagement.

2. The combination set forth in claim 1 in which the end of the collar adjacent the end of the conduit is formed with an internal annular groove for the reception of the end of the conduit and to provide an annular shoulder against which the end of the conduit can abut.

3. The combination set forth in claim 1 in which the ferrule is formed with an annular conical surface lying directly above the annular groove in the collar which in conjunction with the annular groove in the collar forms a space for the entry of the extremity of the tubular metal sheath.

References Cited

UNITED STATES PATENTS

| 2,463,293 | 3/1949 | Mentel | 285—149 |
| 2,479,499 | 8/1949 | Le Clair | 285—259 X |
| 2,686,962 | 8/1954 | Swann | 285—149 X |
| 2,797,111 | 6/1957 | Beazley | 285—149 X |

FOREIGN PATENTS

| 804,583 | 11/1958 | Great Britain. |
| 885,972 | 1/1962 | Great Britain. |

CARL W. TOMLIN, *Primary Examiner.*

THOMAS F. CALLAGHAN, *Examiner.*